(12) United States Patent
Lu et al.

(10) Patent No.: US 12,326,758 B2
(45) Date of Patent: Jun. 10, 2025

(54) CONTROL ASSEMBLY FOR PORTABLE ELECTRONIC DEVICE

(71) Applicant: DEXIN CORP., New Taipei (TW)

(72) Inventors: Ho Lung Lu, New Taipei (TW); Chiu Tai Chang, New Taipei (TW); Min-Chien Chang, New Taipei (TW)

(73) Assignee: DEXIN CORP., New Taipei (TW)

( * ) Notice: Subject to any disclaimer, the term of this patent is extended or adjusted under 35 U.S.C. 154(b) by 370 days.

(21) Appl. No.: 17/994,086

(22) Filed: Nov. 25, 2022

(65) Prior Publication Data
US 2024/0103578 A1 Mar. 28, 2024

(30) Foreign Application Priority Data
Sep. 28, 2022 (TW) .................................. 111136783

(51) Int. Cl.
*G06F 1/16* (2006.01)
*A63F 13/24* (2014.01)
*H04M 1/04* (2006.01)

(52) U.S. Cl.
CPC ............ *G06F 1/1656* (2013.01); *A63F 13/24* (2014.09); *G06F 1/1607* (2013.01); *H04M 1/04* (2013.01); *G06F 1/1632* (2013.01)

(58) Field of Classification Search
CPC ...... A63F 13/24; A63F 13/98; A63F 2250/52; A63F 13/23; A63F 13/20; G06F 1/1607; G06F 1/1632; G06F 1/1656; H04M 1/04
See application file for complete search history.

(56) References Cited

U.S. PATENT DOCUMENTS

| | | | | |
|---|---|---|---|---|
| 8,137,010 | B2 * | 3/2012 | Yoshida | G03B 17/00 |
| | | | | 396/428 |
| 9,081,545 | B1 * | 7/2015 | Lin | A63F 13/24 |
| 9,126,119 | B2 * | 9/2015 | Joynes | G06F 3/0219 |
| 9,539,507 | B2 * | 1/2017 | Schoenith | A63F 13/24 |
| 10,092,830 | B2 * | 10/2018 | Townley | A63F 13/23 |
| 10,456,670 | B2 * | 10/2019 | Chen | A63F 13/98 |
| 10,560,558 | B1 * | 2/2020 | Kosa | G06F 1/1669 |
| 10,688,387 | B2 * | 6/2020 | Croft | G06F 3/0338 |
| 10,933,315 | B2 * | 3/2021 | Fang | A63F 13/92 |
| 11,027,191 | B2 * | 6/2021 | Oh | A63F 13/98 |
| 11,045,723 | B1 * | 6/2021 | Lee | A63F 13/23 |
| 11,110,344 | B2 * | 9/2021 | Koizumi | A63F 13/92 |

(Continued)

FOREIGN PATENT DOCUMENTS

| CN | 107537155 A | * | 1/2018 |
|---|---|---|---|
| CN | 211025087 U | * | 7/2020 |

*Primary Examiner* — Allen L Parker
*Assistant Examiner* — Martin Antonio Asmat Uceda
(74) *Attorney, Agent, or Firm* — Maschoff Brennan

(57) ABSTRACT

A control assembly configured for an electronic device, the control assembly includes a mount seat configured to be installed on the electronic device, two first connection components movably connected to the mount seat, two second connection component movably connected to the two first connection components, respectively, two controllers configured to communicate with the electronic device, the two controllers are separated apart from each other and movably connected to the second connection components, respectively, such that the two controllers are connected to the mount seat via the two second connection components and the two first connection components.

9 Claims, 11 Drawing Sheets

(56) References Cited

U.S. PATENT DOCUMENTS

| | | | |
|---|---|---|---|
| 11,389,721 B2* | 7/2022 | Khaira | A63F 13/23 |
| 11,395,961 B2* | 7/2022 | Chung | A63F 13/235 |
| 11,622,036 B2* | 4/2023 | Takura | H04M 1/21 |
| | | | 455/575.1 |
| 2013/0095925 A1* | 4/2013 | Xu | G06F 1/206 |
| | | | 463/37 |
| 2013/0341214 A1* | 12/2013 | King | A63F 13/98 |
| | | | 206/216 |
| 2016/0107082 A1* | 4/2016 | Song | A63F 13/98 |
| | | | 463/37 |
| 2019/0022522 A1* | 1/2019 | Croft | G06F 3/0338 |
| 2021/0299553 A1* | 9/2021 | Lu | G06F 1/1632 |

\* cited by examiner

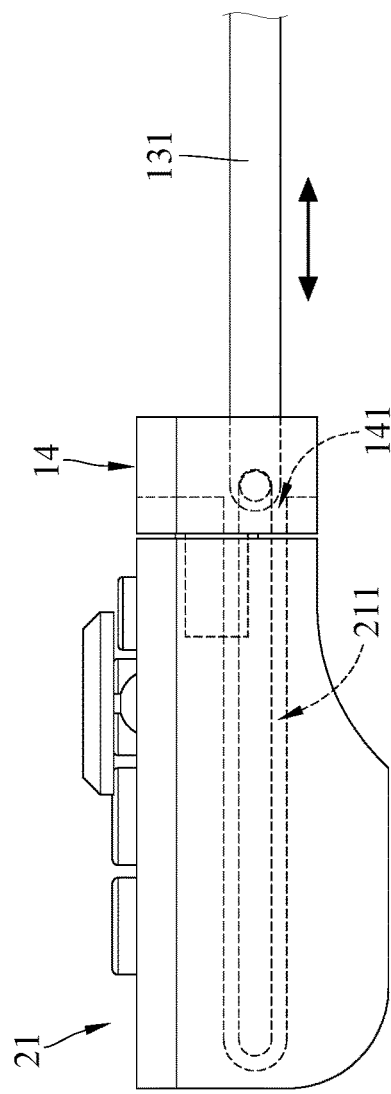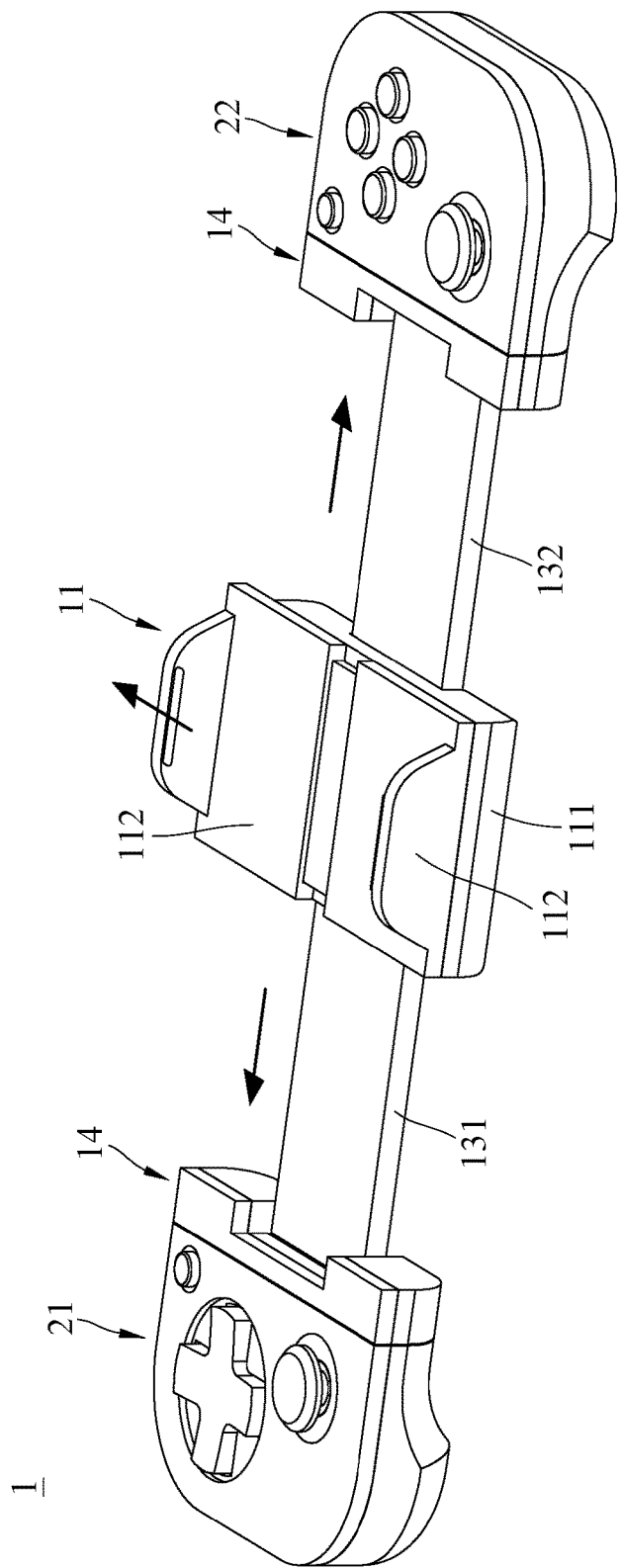
FIG. 11
FIG. 12

CONTROL ASSEMBLY FOR PORTABLE ELECTRONIC DEVICE

CROSS-REFERENCE TO RELATED APPLICATIONS

This non-provisional application claims priority under 35 U.S.C. § 119(a) on Patent Application No(s). 111136783 filed in Taiwan (R.O.C.) on Sep. 28, 2022, the entire contents of which are hereby incorporated by reference.

TECHNICAL FIELD

The disclosure relates to a control assembly for portable electronic device.

BACKGROUND

In recent years, with the development of science and technology, people can play various video games on portable devices which have touch screen, such as smartphones or tablet computers. Even though there is a virtual controller on touch screens for the user to operate the video game, it is still very inconvenient to play because the virtual controller covers some part of the screen and lacks tactile feedback. To this end, smartphone-based controllers are developed to provide physical buttons for users to run games smoothly. However, the conventional smartphone-based controllers are not flexible in changing size for storage, portability, or other purposes.

SUMMARY

Accordingly, one aspect of the disclosure is to provide a control assembly which enables a highly flexible operation.

One embodiment of the disclosure provides a control assembly configured for an electronic device, the control assembly includes a mount seat configured to be installed on the electronic device, two first connection components movably connected to the mount seat, two second connection component movably connected to the two first connection components, respectively, two controllers configured to communicate with the electronic device, the two controllers are separated apart from each other and movably connected to the second connection components, respectively, such that the two controllers are connected to the mount seat via the two second connection components and the two first connection components.

According to the control assembly as discussed in the above embodiments of the disclosure, the first connection component is movably connected to the mount seat, the second connection component is movably connected to the first connection component, and the controller is movably connected to the second connection component so as to be movably connected to the first connection component via the second connection component, thus the connections among the components of the control assembly enable a highly flexible adjustment and thereby achieving an ergonomic and flexible operation.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein:

FIG. 11 is a partially-enlarged side view of the control assembly in FIG. 9;

FIG. 12 is a perspective view of the control assembly in FIG. 9 being extended;

DETAILED DESCRIPTION

Figure 1:
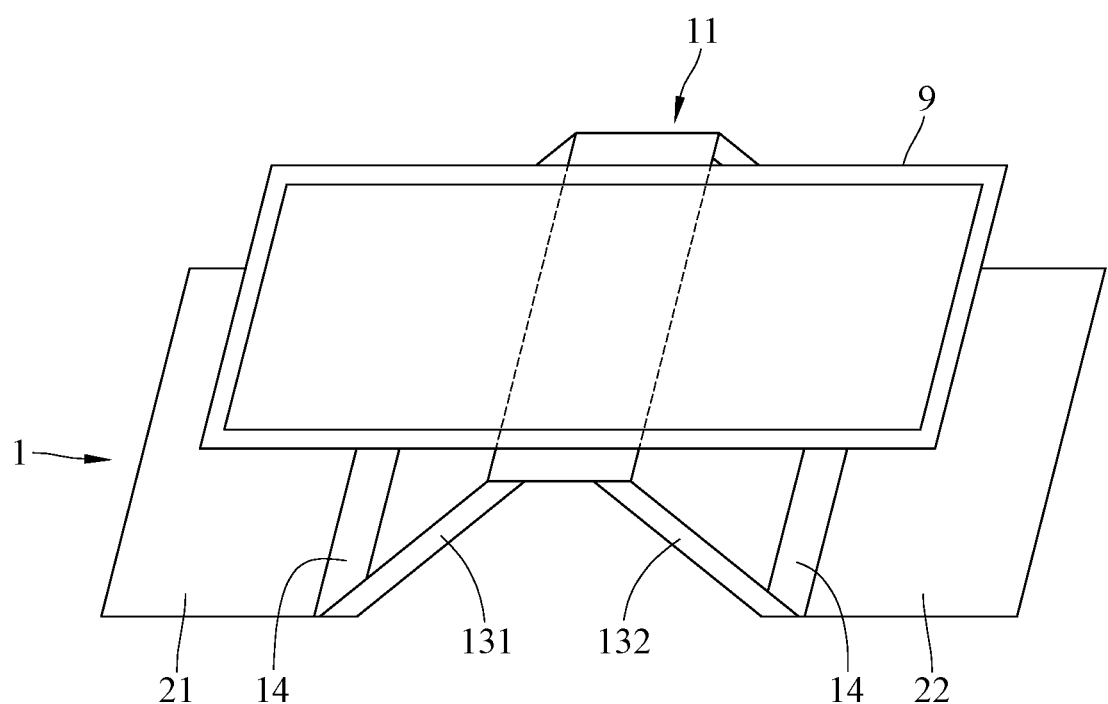
FIG. 1 is a schematic view of a control assembly according to one embodiment of the disclosure being applied on an electronic device.

Aspects and advantages of the disclosure will become apparent from the following detailed descriptions with the accompanying drawings. The inclusion of such details provides a thorough understanding of the disclosure sufficient to enable one skilled in the art to practice the described embodiments but it is for the purpose of illustration only and should not be understood to limit the disclosure. On the contrary, it is intended to cover alternatives, modifications, and equivalents as can be included within the spirit and scope of the described embodiments as defined by the appended claims. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features.

It is to be understood that the phraseology and terminology used herein are for the purpose of better understanding the descriptions and should not be regarded as limiting. Unless specified or limited otherwise, the terms "mounted," "connected," and variations thereof are used broadly and encompass both direct and indirect mountings and connections. As used herein, the terms "substantially" or "approximately" may describe a slight deviation from a target value, in particular a deviation within the production accuracy and/or within the necessary accuracy, so that an effect as present with the target value is maintained. Unless specified or limited otherwise, the phrase "at least one" as used herein may mean that the quantity of the described element or component is one or more than one but does not necessarily mean that the quantity is only one. The term "and/or" may be used herein to indicate that either or both of two stated possibilities.

Firstly, referring to FIG. 1, one embodiment of the disclosure provides a control assembly 1 suitable for a portable electronic device 9 (also called "electronic device 9" hereinafter). The electronic device 9 may be but not limited to be a smartphone or tablet computer. The control assembly 1 is able to communicate with the electronic device 9 in any suitable wireless or wired manner so as to provide an approach for users to control the electronic device 9.

As shown, the control assembly 1 may include a mount seat 11, first connection components 131 and 132, two second connection components 14, and controllers 21 and 22. The mount seat 11 means the part of the control assembly 1 that can be used to support or fix the electronic device 9. Any means that are suitable for stably holding the electronic device 9 in position can be employed as the mount seat 11 of the disclosure. The first connection components 131 and 132 are movably connected to the mount seat 11. For example, the first connection components 131 and 132 are movably connected to two opposite sides of the mount seat 11, respectively. The second connection components 14 are movably connected to the first connection components 131 and 132, respectively, and the second connection components 14 are movably connected to the mount seat 11 respectively via the first connection components 131 and 132. The controllers 21 and 22 are movably connected to the second connection components 14, respectively, and the controllers 21 and 22 are movably connected to the first connection components 131 and 132 respectively via the second connection components 14. That is, the controllers 21 and 22 are movably connected to the mount seat 11 via the second connection components 14 and the first connection components 131 and 132.

Note that the controllers 21 and 22 mean the handheldable parts of the control assembly 1 that can be used to control the electronic device 9. Any means that are handheldable and capable of pairing with and controlling the electronic device 9 can be employed as the controllers 21 and 22 of the disclosure.

As such, the mount seat 11, the first connection components 131 and 132, the second connection components 14, and the controllers 21 and 22 are movable relative to one another, thus the controllers 21 and 22 are able to be moved to suitable positions relative to the mount seat 11 and the electronic device 9 on the mount seat 11 as required whether they are paired with the electronic device 9 or not.

FIG. 1 is schematically depicted in a simplified manner merely for explaining the basic configurations of the control assembly 1. Any suitable means or mechanism that can embody the same arrangement as shown in FIG. 1 can be employed in the control assembly 1.

Figure 2:
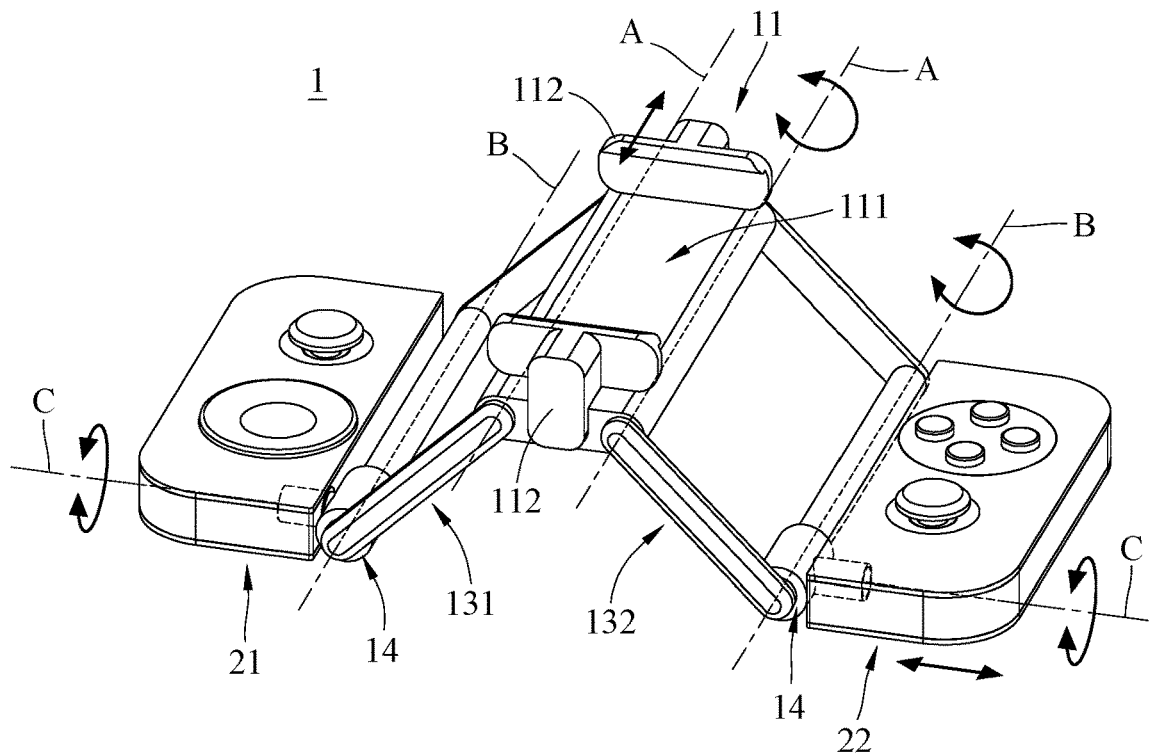
FIG. 2 is a perspective view of a control assembly according to one embodiment of the disclosure.
Figure 3:
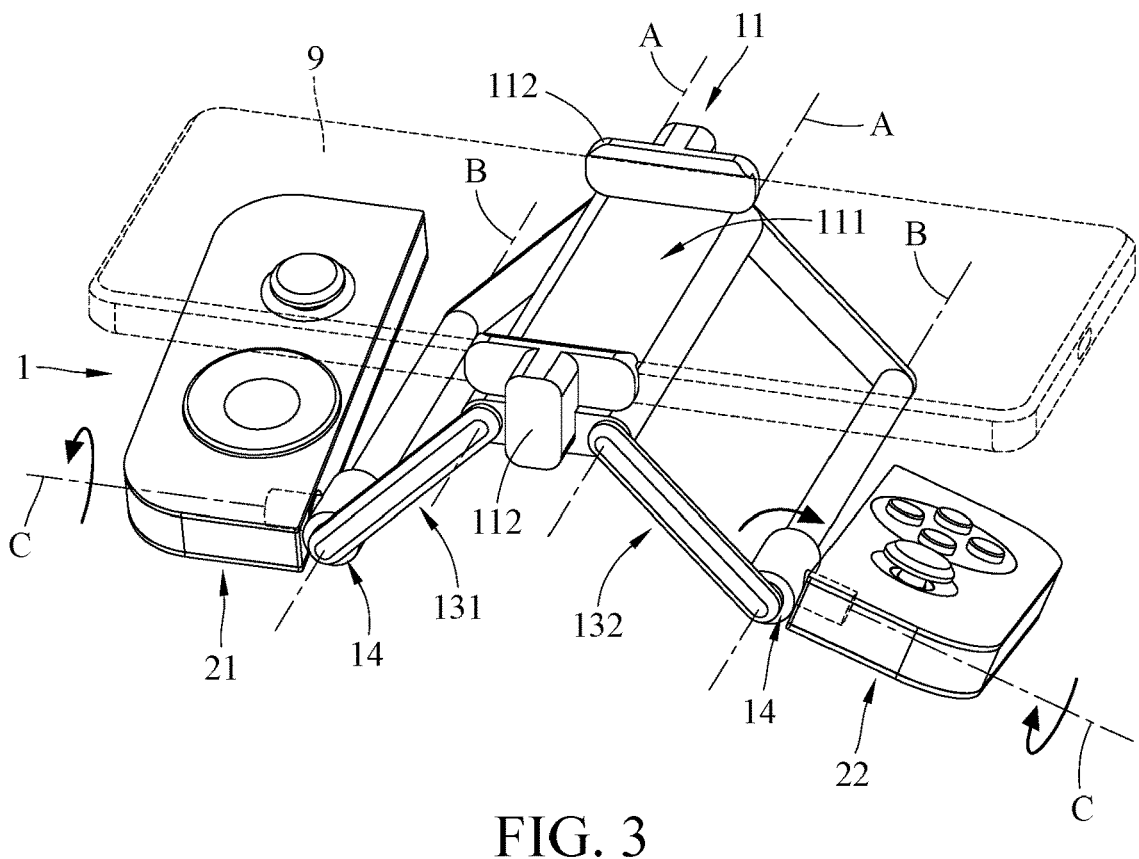
FIG. 3 is a perspective view showing a control assembly according to one embodiment of the disclosure being applied on an electronic device.
Figure 4:
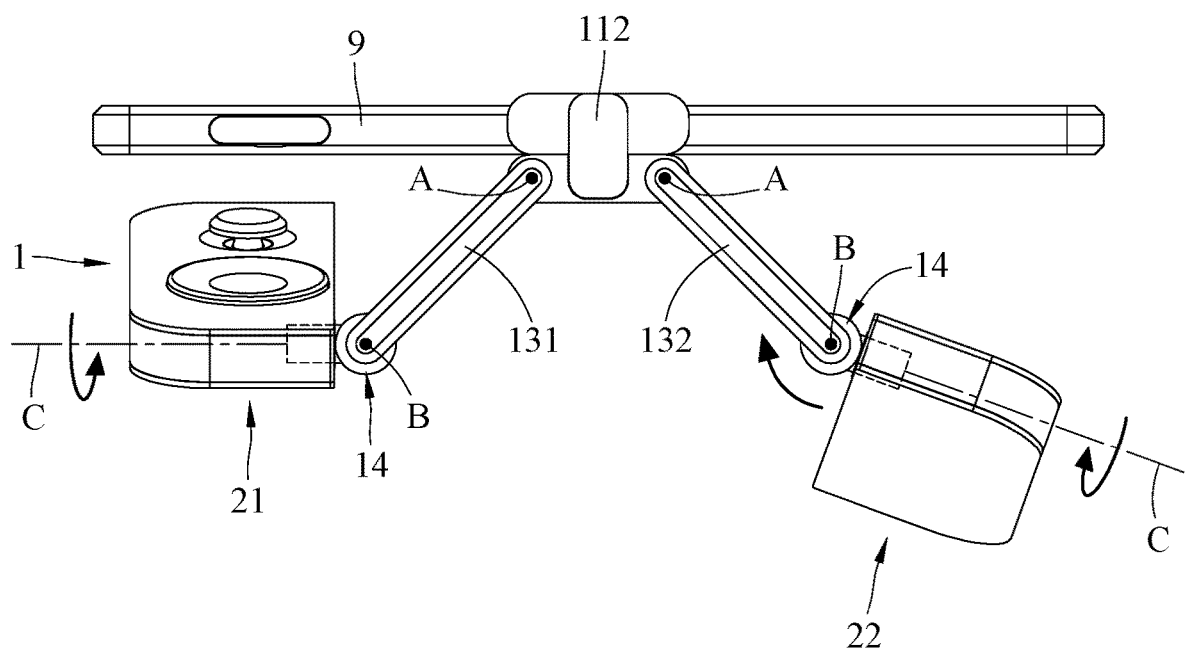
FIG. 4 is a side view of the control assembly and the electronic device in FIG. 3.

For example, please refer to FIGS. 2-4, one of exemplary embodiments of the control assembly 1, as discussed in FIG. 1, is provided. It is noted that the angle and position of the component of the control assembly 1 in FIGS. 2-4 are exemplary for illustrating a possible operation status of the control assembly 1 but not intended to limit the disclosure. Specifically, in this embodiment, the mount seat 11 of the control assembly 1 may include a supporting portion 111 and two clamping structures 112, the supporting portion 111 is the part of the mount seat 11 used to support the electronic device 9, the clamping structures 112 are the part of the mount seat 11 configured to clamp the electronic device 9. Optionally, at least one of the clamping structures 112 may be slidably disposed on the supporting portion 111. As shown, at least one of the clamping structures 112 may be movable towards or away from the other clamping structure 112 so as to spare a space for fitting the size of the electronic device 9.

In this embodiment, the first connection components 131 and 132 may be rotatably connected to two opposite sides of the supporting portion 111 of the mount seat 11. As shown, each of the first connection components 131 and 132 may be rotatable relative to the supporting portion 111 of the mount seat 11 about an axis A. The second connection components 14 may be rotatably connected to the first connection components 131 and 132, respectively. As shown, the second connection components 14 may be respectively rotatable relative to the first connection components 131 and 132 about an axis B. The axis B may be substantially parallel to the axis A; in other words, the axis in which the second connection components 14 are rotatable relative to the first connection components 131 and 132 is parallel to the axis in which the first connection components 131 and 132 are rotatable relative to the mount seat 11.

The controllers 21 and 22 are rotatably connected to the second connection components 14. As shown, each of the controllers 21 and 22 may be rotatable relative to the second connection components 14 about an axis C. The axis C may be substantially perpendicular to the axis A and axis B; in other words, the axis in which the controllers 21 and 22 are rotatable relative to the second connection components 14 is perpendicular to the axis in which the second connection components 14 are rotatable relative to the first connection components 131 and 132 and the axis in which the first connection components 131 and 132 are rotatable relative to the mount seat 11.

As such, the positions and angles of the controllers 21 and 22 relative to the mount seat 11, the first connection components 131 and 132, and the second connection components 14 and the distance between the controllers 21 and 22 all become adjustable, and thus enabling a highly flexible adjustment of the controllers 21 and 22 relative to the mount seat 11 and the electronic device 9 on the mount seat 11, thereby achieving an ergonomic and flexible operation when applied to an electronic device 9.

Figure 5:
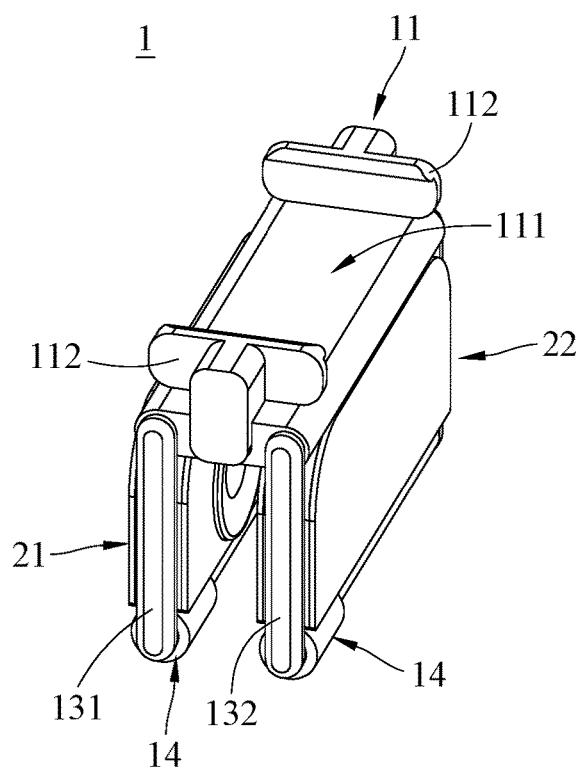
FIG. 5 is a perspective view of the control assembly in FIG. 2 when it is in a stored status.

For example, please see FIG. 5, the control assembly 1 may be folded into a stored status to have a smaller size. As shown, the connections among the mount seat 11, the first connection components 131 and 132, the second connection components 14, and the controllers 21 and 22 allow the controllers 21 and 22 to be arranged side by side and located at the same side (e.g., bottom side) of the mount seat 11 so as to largely reduce the size of the control assembly 1 and thereby making the control assembly 1 a compact pocket size.

Figure 6:
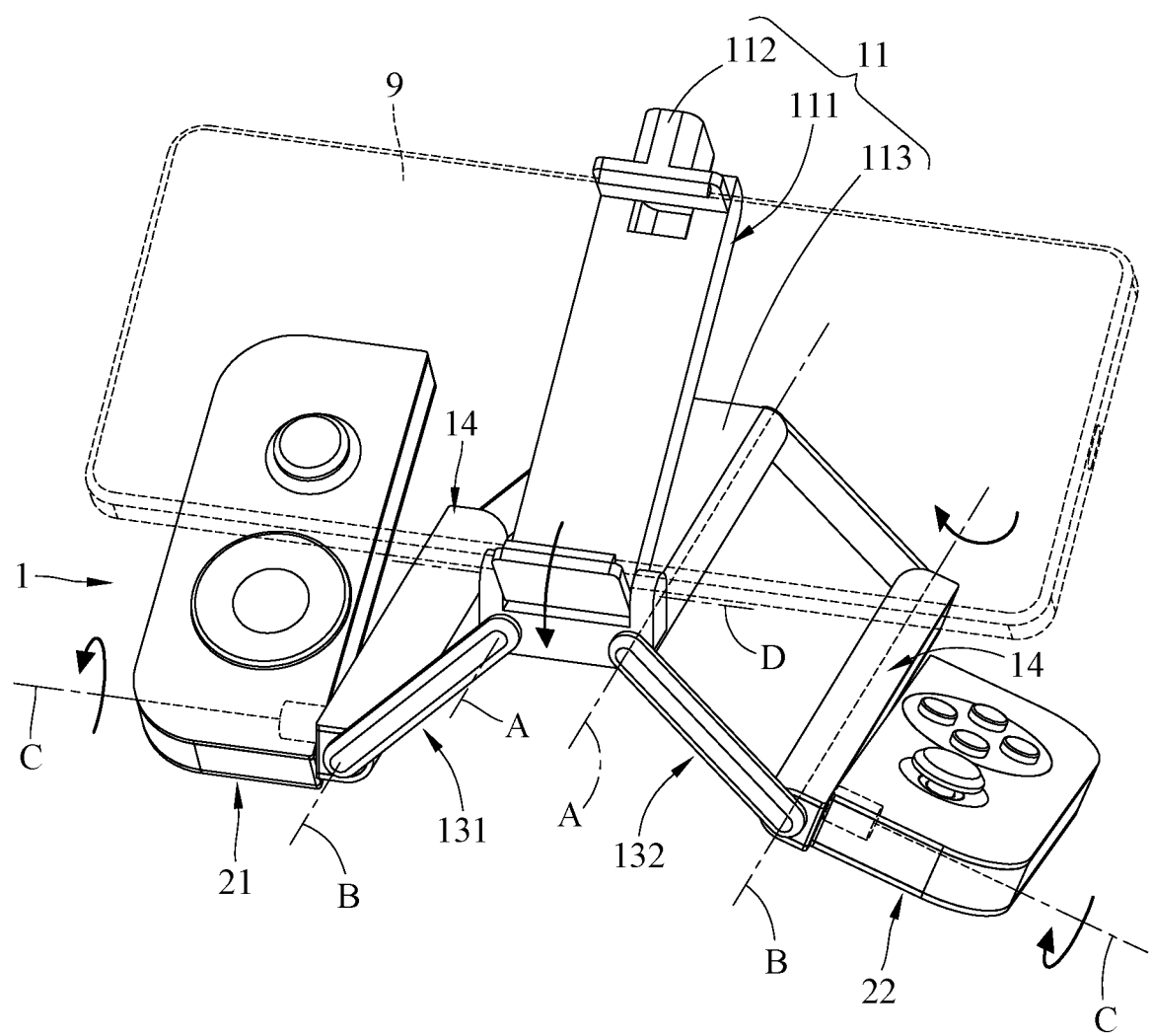
FIG. 6 is a perspective view showing a control assembly according to another embodiment of the disclosure being applied on an electronic device.
Figure 7:
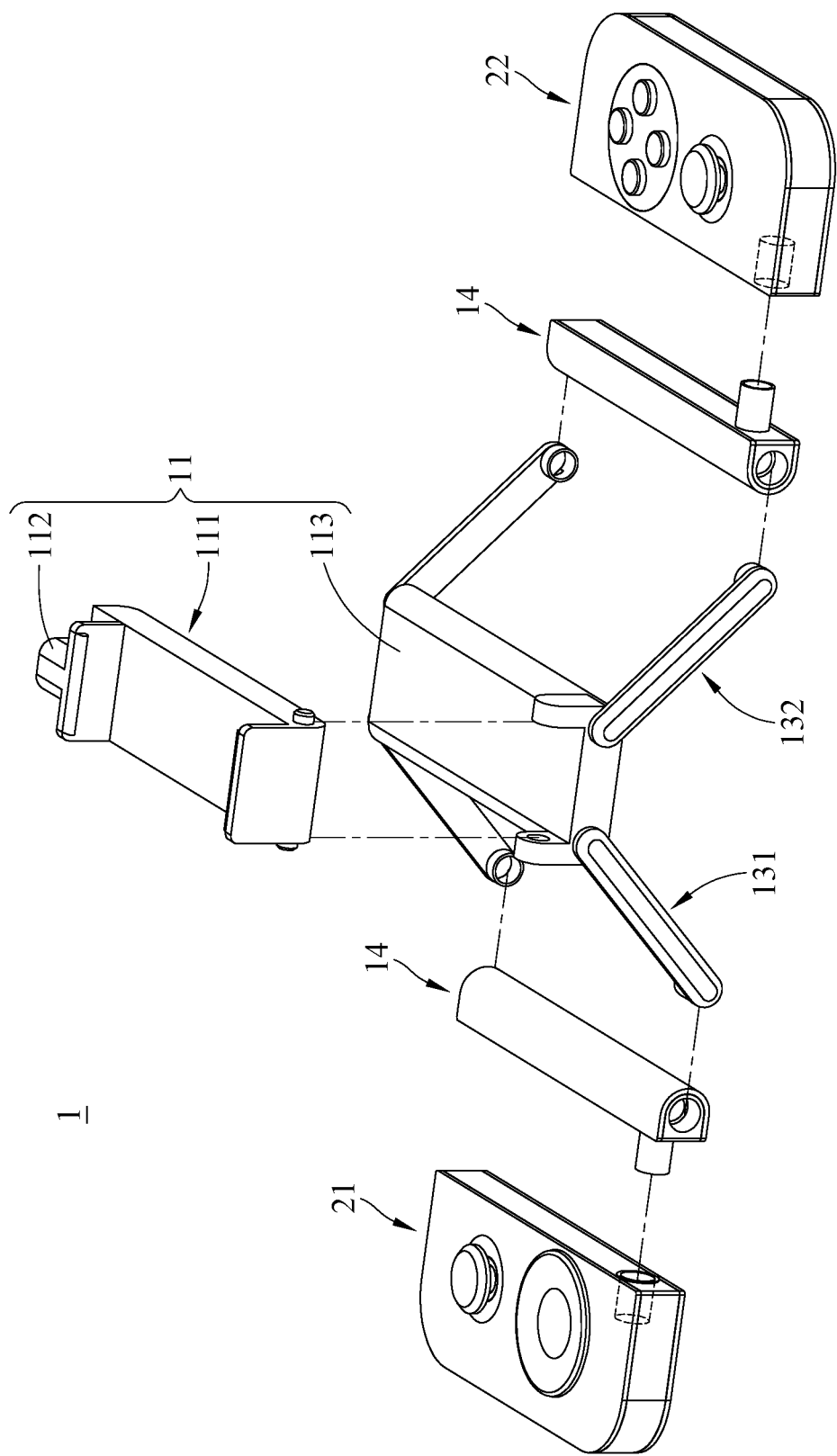
FIG. 7 is an exploded view of the control assembly in FIG. 6.
Figure 8:
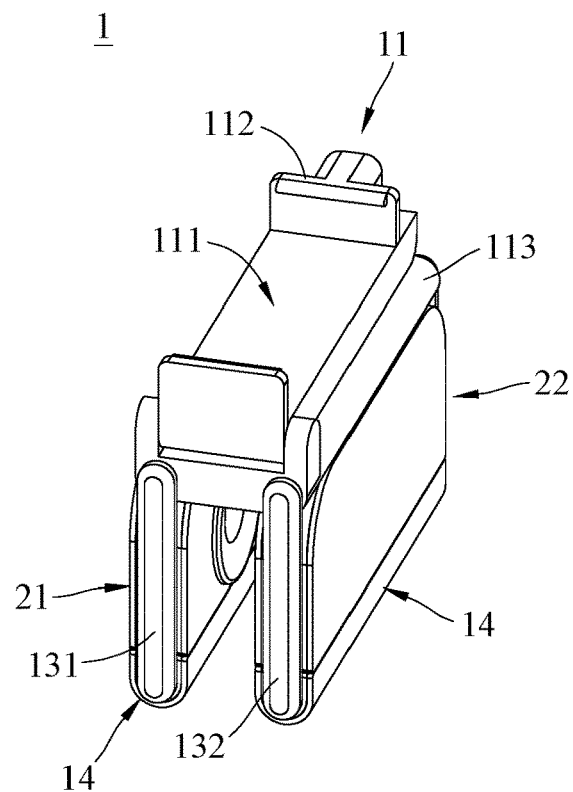
FIG. 8 is a perspective view of the control assembly in FIG. 6 when it is in a stored status.

Alternatively, for example, please refer to FIGS. 6-8, it is noted that the angle and position of the component of the control assembly 1 in FIGS. 6-8 are exemplary for illustrating a possible operation status of the control assembly 1 but not intended to limit the disclosure. Specifically, in this embodiment, the mount seat 11 of the control assembly 1 may further include a base part 113, the supporting portion 111 may be rotatably connected to the base part 113. As shown, the supporting portion 111 may be rotatably disposed on the base part 113 about an axis D. The axis D may at least be substantially perpendicular to the axis A and the axis B. The first connection components 131 and 132 may be rotatably connected to the base part 113. In such an arrangement, the angle of the electronic device 9 may be adjustable by pivoting the supporting portion 111 relative to the base part 113. It is noted that the mount seat 11 in FIG. 6 may be applied to the embodiment shown in FIG. 2.

In addition, in this embodiment, the second connection components 14 are rotatably connected to the first connection components 131 and 132, respectively, and are rotatable about the axis B relative to the first connection components 131 and 132; the controllers 21 and 22 are rotatably connected to the second connection components 14, respectively, and are rotatable about the axis C relative to the second connection components 14.

Thus, as the arrows shown in FIG. 6, the positions and angles of the controllers 21 and 22 relative to the mount seat 11, the first connection components 131 and 132, and the second connection components 14 and the distance between the controllers 21 and 22 are all adjustable, and thus enabling a highly flexible adjustment of the controllers 21 and 22 relative to the mount seat 11 and the electronic device 9 on the mount seat 11, thereby achieving an ergonomic and flexible operation when applied to an electronic device 9.

Similarly, in FIG. 8, the connections among the mount seat 11, the first connection components 131 and 132, the second connection components 14, and the controllers 21 and 22 also allow the controllers 21 and 22 to be arranged side by side and located at the same side of the mount seat 11 so as to largely reduce the size of the control assembly 1 down to a compact pocket size.

Figure 9:
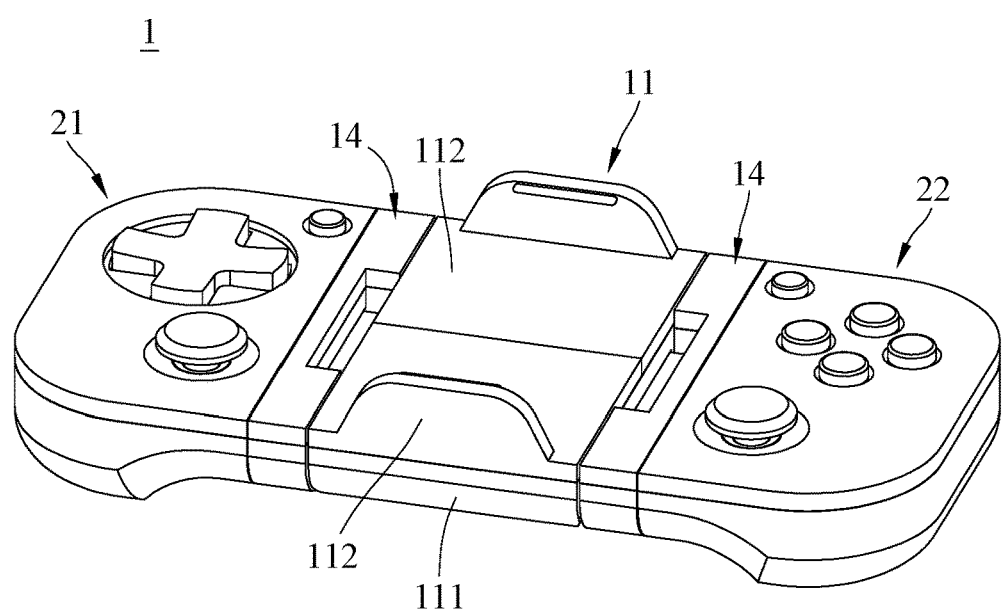
FIG. 9 is a perspective view of a control assembly according to another embodiment of the disclosure.
Figure 10:
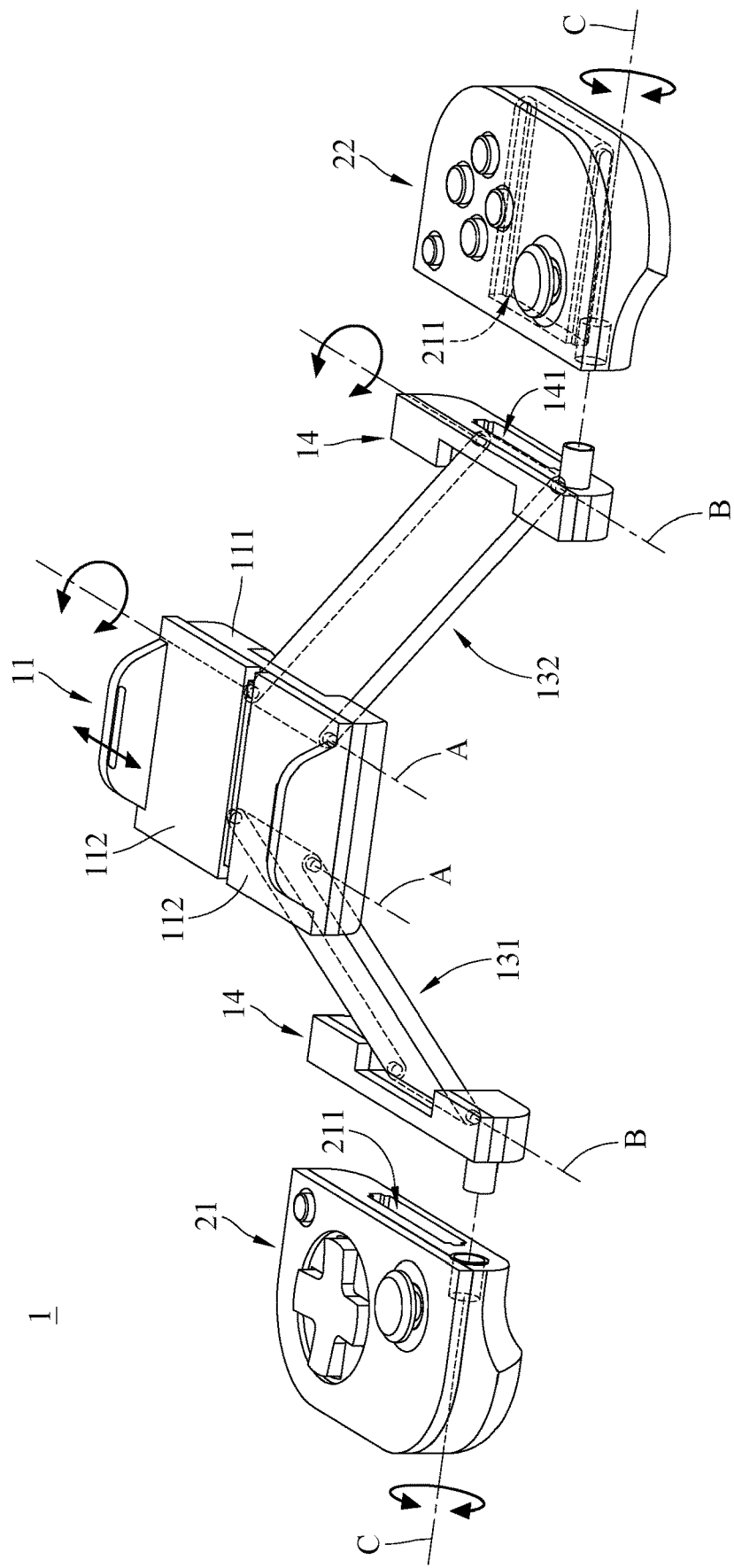
FIG. 10 is an exploded view of the control assembly in FIG. 9.

Alternatively, please refer to FIGS. 9-11, it is noted that the angle and position of the component of the control assembly 1 in FIGS. 9-11 are exemplary for illustrating a possible operation status of the control assembly 1 but not intended to limit the disclosure. Specifically, in this embodiment, the first connection components 131 and 132 are slidably disposed on the second connection components 14 and the controllers 21 and 22 which are rotatably connected to the second connection components 14, and the second connection components 14 are also able to be rotatably connected to the first connection components 131 and 132. Specifically, in this embodiment, each of the second connection components 14 may have a first accommodation groove 141, the controllers 21 and 22 may each have a second accommodation groove 211, the first accommodation grooves 141 of the second connection components 14 may correspond to the second accommodation grooves 211 of the controllers 21 and 22, respectively.

Taking the side of the control assembly 1 having the controller 21 as an example, the first connection component 131 is slidably and rotatably at the first accommodation groove 141 of the second connection component 14 and is slidably and removably into the second accommodation groove 211 of the controller 21. As such, the second connection component 14 and the controller 21 may be slidable on the first connection component 131 along extension direction of the first accommodation groove 141 and the second accommodation groove 211 so as to be selectively move towards or away from the mount seat 11. Similarly, the second connection component 14 and the controller 22 may be slidable on the first connection component 132 along extension direction of the first accommodation groove 141 and the second accommodation groove 211 so as to be selectively move towards or away from the mount seat 11.

Figure 13:
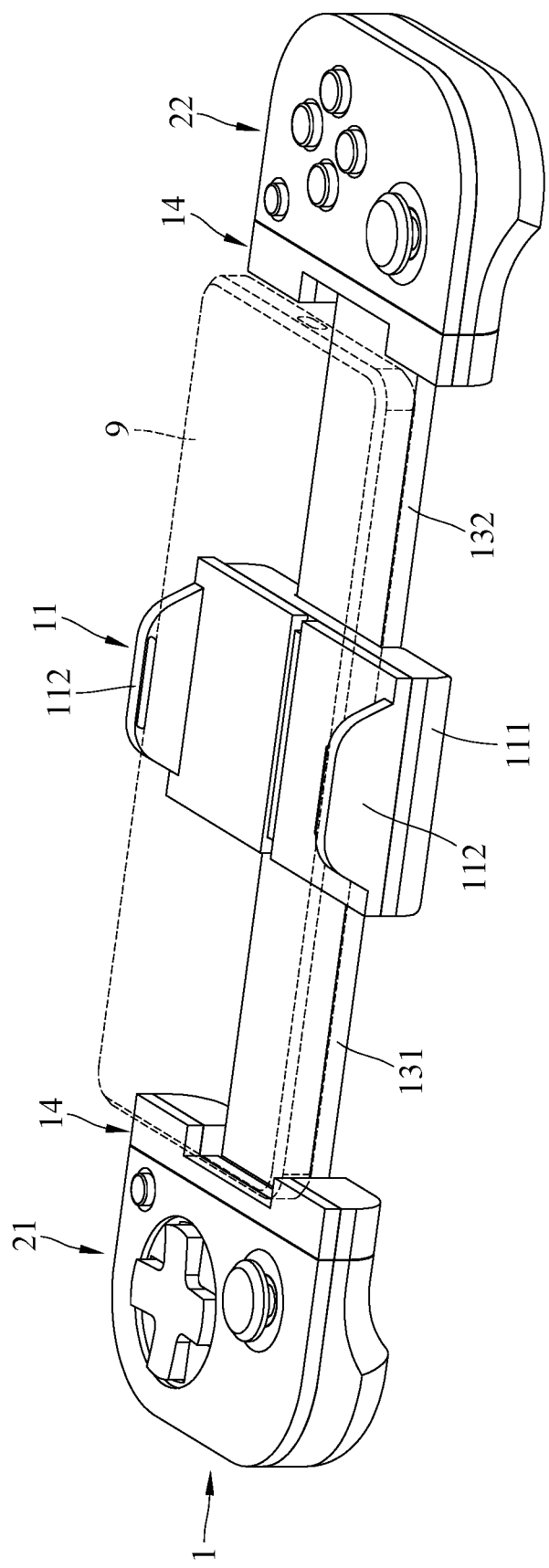
FIG. 13 is a perspective view showing the control assembly in FIG. 12 being applied on an electronic device.

Thus, the lengths of the parts of the first connection components 131 and 132 exposed by the second connection components 14 and the controllers 21 and 22 may be selectively adjusted by sliding the second connection components 14 and the controllers 21 and 22 relative to the first connection components 131 and 132. For example, as shown in FIG. 12, the second connection components 14 and the controllers 21 and 22 may be moved away from the mount seat 11 respectively along the first connection components 131 and 132. By doing so, as shown in FIG. 13, the distance between the second connection components 14 may be adjusted to fit the size of the electronic device 9.

Figure 14:
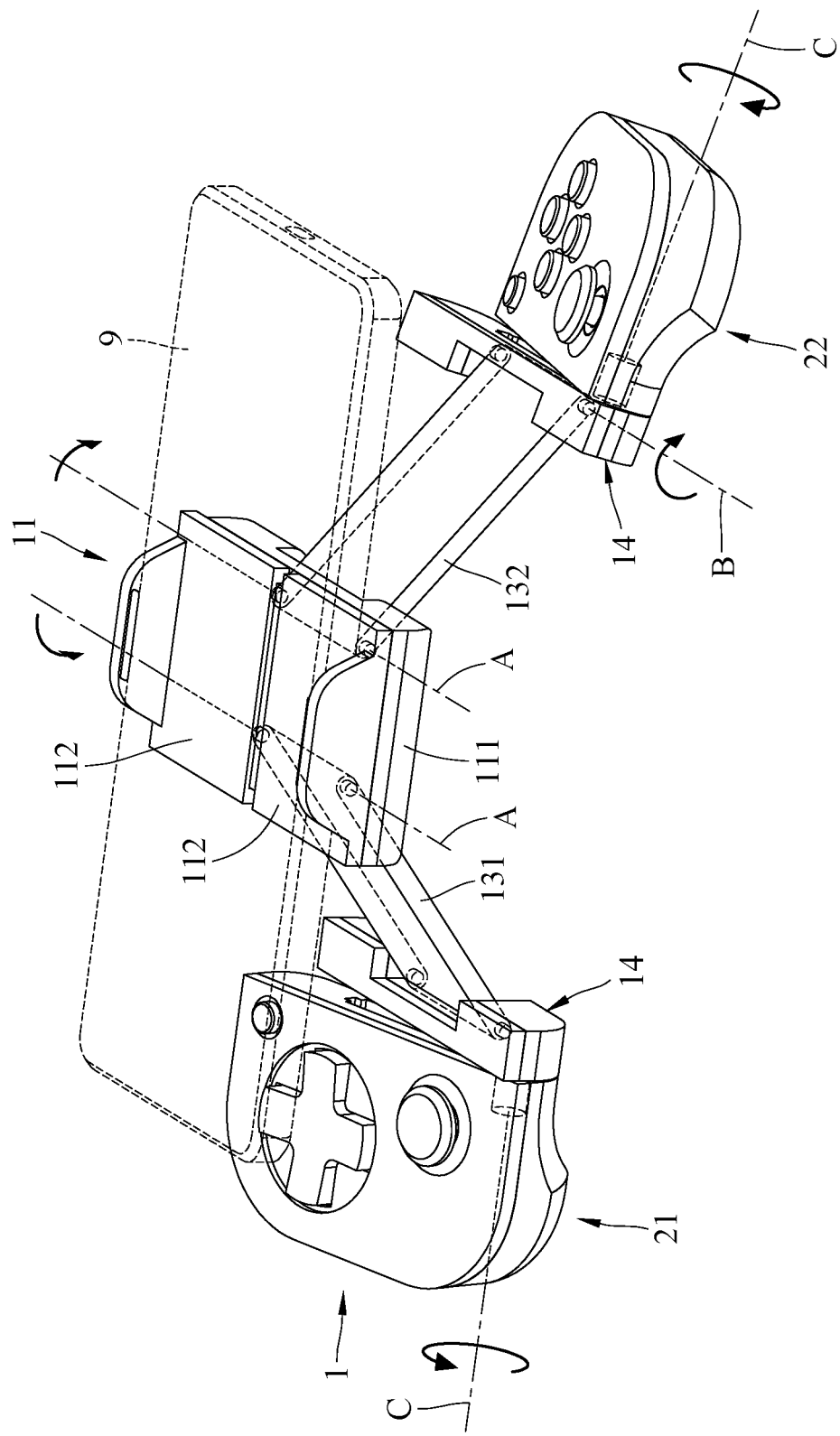
FIG. 14 depicts another operation of the control assembly in FIG. 13.

As shown in FIG. 14, when the second connection component 14 and the controller 21 slide relative to the first connection component 131 to a position that causes the first connection component 131 to be not located in the second accommodation groove 211 of the controller 21 but still located in the first accommodation groove 141 of the second connection component 14 (i.e., when the first connection component 131 is not in the controller 21 but still in the second connection component 14), the first connection component 131 and the second connection component 14 are pivotable relative to each other, the controller 21 is rotatable relative to the second connection component 14, and the second connection component 14 and the first connection component 131 are rotatable relative to each other. Similarly, when the second connection component 14 and the controller 22 slide relative to the first connection component 132 to a position that causes the first connection component 132 to be not located in the second accommodation groove 211 of the controller 22 but still located in the first accommodation groove 141 of the second connection component 14 (i.e., when the first connection component 132 is not in the controller 22 but still in the second connection component 14), the first connection component 132 and the second connection component 14 are pivotable relative to each other, the controller 22 is rotatably relative to the second connection component 14, and the second connection component 14 and the first connection component 132 are rotatable relative to each other.

In addition, in this embodiment, the clamping structures 112 of the mount seat 11 may provide surfaces for supporting the electronic device 9. At least one of the clamping structures 112 may be moved in a direction parallel to the axis A so that the distance between the clamping structures 112 may be adjusted to fit the size of the electronic device 9. It is noted that the mount seat 11 in FIG. 6 may be applied to the embodiment shown in FIG. 9.

Figure 15:
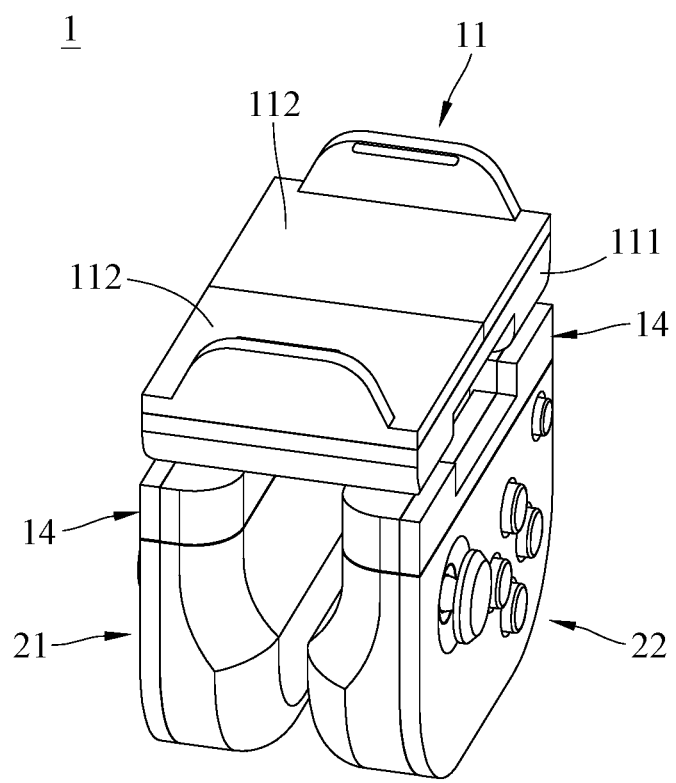
FIG. 15 is a perspective view of the control assembly in FIG. 9 when it is in a stored status.

The status of the control assembly 1 in FIG. 9 may be further folded into a smaller size. In specifically, referring to FIGS. 9 and 15, by pivoting the first connection components 131 and 132 relative to the mount seat 11, the controllers 21 and 22 may be moved to the same side of the mount seat 11 from two opposite sides of the mount seat 11 so as to further reduce the size of the control assembly 1.

According to the control assembly as discussed in the above embodiments of the disclosure, the first connection component is movably connected to the mount seat, the second connection component is movably connected to the first connection component, and the controller is movably connected to the second connection component so as to be movably connected to the first connection component via the second connection component, thus the connections among the components of the control assembly enable a highly flexible adjustment and thereby achieving an ergonomic and flexible operation.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A control assembly, configured for an electronic device, comprising:
   a mount seat configured to be installed on the electronic device;
   two first connection components movably connected to the mount seat;
   two second connection component movably connected to the two first connection components, respectively; and
   two controllers configured to communicate with the electronic device, wherein the two controllers are separated apart from each other and movably connected to the second connection components, respectively, such that the two controllers are connected to the mount seat via the two second connection components and the two first connection components;
   wherein each of the two second connection components has a first accommodation groove, each of the two controllers has a second accommodation groove, the two first connection components are slidably and rotatably located in the first accommodation grooves of the two second connection components, respectively, the two first connection components are slidably and removably inserted into the second accommodation grooves of the two controllers, respectively.

2. The control assembly according to claim 1, wherein the two first connection components are rotatably connected to two opposite sides of the mount seat, respectively.

3. The control assembly according to claim 2, wherein the two second connection components are rotatably connected to the two first connection components, respectively.

4. The control assembly according to claim 3, wherein an axis in which the two second connection components are rotatable relative to the two first connection components is parallel to an axis in which the two first connection components are rotatable relative to the mount seat.

5. The control assembly according to claim 4, wherein the two controllers are rotatably connected to the two second connection components, respectively.

6. The control assembly according to claim 5, wherein an axis in which the two controllers are rotatable relative to the two second connection components is perpendicular to an axis in which the two second connection components are rotatable relative to the two first connection components.

7. The control assembly according to claim 2, wherein the mount seat comprises a supporting portion and a base part, the supporting portion is rotatably connected to the base part, and the two first connection components are movably connected to the base part.

8. The control assembly according to claim 7, wherein an axis in which the supporting portion is rotatable relative to the base part is perpendicular to an axis in which the two first connection components are rotatable relative to the mount seat.

9. The control assembly according to claim 7, wherein the mount seat further comprises two clamping structures, at least one of the two clamping structures is slidably disposed on the supporting portion.

* * * * *